(12) United States Patent
Suzuki

(10) Patent No.: US 8,427,696 B2
(45) Date of Patent: Apr. 23, 2013

(54) COLOR PROCESSING METHOD AND APPARATUS THEREOF

(75) Inventor: Takahiro Suzuki, Ohta-ku (JP)

(73) Assignee: Canon Kabushiki Kaisha, Tokyo (JP)

( * ) Notice: Subject to any disclaimer, the term of this patent is extended or adjusted under 35 U.S.C. 154(b) by 1406 days.

(21) Appl. No.: 11/692,727

(22) Filed: Mar. 28, 2007

(65) Prior Publication Data

US 2007/0229867 A1    Oct. 4, 2007

(30) Foreign Application Priority Data

Mar. 31, 2006   (JP) .................................. 2006-100385

(51) Int. Cl.
| | |
|---|---|
| *G06F 15/00* | (2006.01) |
| *H04N 1/46* | (2006.01) |
| *H04N 1/60* | (2006.01) |
| *G03F 3/08* | (2006.01) |
| *G09G 5/00* | (2006.01) |
| *G09G 5/10* | (2006.01) |
| *G06K 9/00* | (2006.01) |

(52) U.S. Cl.
USPC ............ 358/1.9; 358/515; 358/518; 358/519; 358/520; 358/2.1; 345/690; 345/604; 382/167

(58) Field of Classification Search ........................ None
See application file for complete search history.

(56) References Cited

U.S. PATENT DOCUMENTS

| | | | | |
|---|---|---|---|---|
| 5,416,890 | A * | 5/1995 | Beretta ......................... | 345/590 |
| 5,745,263 | A * | 4/1998 | Oryo ............................ | 358/518 |
| 6,603,483 | B1 * | 8/2003 | Newman ...................... | 345/593 |
| 6,646,762 | B1 * | 11/2003 | Balasubramanian et al. . | 358/1.9 |
| 6,882,445 | B1 * | 4/2005 | Takahashi et al. ............ | 358/1.9 |
| 6,909,521 | B1 * | 6/2005 | Murakami ..................... | 358/1.2 |
| 7,253,923 | B2 * | 8/2007 | Fukasawa et al. ............. | 358/1.9 |
| 7,463,386 | B2 * | 12/2008 | Misumi .......................... | 358/1.9 |
| 7,990,575 | B2 * | 8/2011 | Suzuki .......................... | 358/1.9 |
| 8,325,202 | B2 * | 12/2012 | Kanai et al. ................... | 345/601 |
| 2002/0181000 | A1 * | 12/2002 | Fukasawa et al. ............. | 358/1.9 |
| 2003/0043166 | A1 * | 3/2003 | Kumada et al. ............... | 345/589 |
| 2003/0164968 | A1 * | 9/2003 | Iida ................................ | 358/1.9 |
| 2005/0036173 | A1 * | 2/2005 | Hayashi et al. ................ | 358/2.1 |
| 2005/0078122 | A1 * | 4/2005 | Ohga ............................. | 345/589 |
| 2005/0219585 | A1 * | 10/2005 | Suzuki et al. .................. | 358/1.9 |
| 2005/0253866 | A1 * | 11/2005 | Kim et al. ...................... | 345/594 |
| 2005/0259109 | A1 * | 11/2005 | Stokes ........................... | 345/590 |
| 2005/0275911 | A1 * | 12/2005 | Yamada et al. ................ | 358/518 |
| 2006/0072133 | A1 * | 4/2006 | Han et al. ........................ | 358/1.9 |
| 2006/0158669 | A1 * | 7/2006 | Haikin et al. .................. | 358/1.9 |

(Continued)

FOREIGN PATENT DOCUMENTS

JP        08-046776 A        2/1996

OTHER PUBLICATIONS

Jan Morovic,"To Develop a Universal Gamut Mapping Algorithm", Oct. 1998.

*Primary Examiner* — Hilina S Kassa
(74) *Attorney, Agent, or Firm* — Carter, DeLuca, Farrell & Schmidt LLP

(57) ABSTRACT

A gamut mapping mode is input in accordance with a user instruction. A color gamut of an output device is obtained. A moving range of a focal point is set in accordance with the gamut mapping mode. Gamut mapping is performed based on the color gamut of the output device and the moving range of the focal point.

7 Claims, 24 Drawing Sheets

U.S. PATENT DOCUMENTS

2007/0003136 A1* 1/2007 Shimbaru .................... 382/167
2007/0058181 A1* 3/2007 Hatori ........................... 358/1.9
2008/0279282 A1* 11/2008 Kobayashi et al. ...... 375/240.24

* cited by examiner

FIG. 6

| | COLOR CONVERSION PARAMETER |
|---|---|
| LIGHTNESS-ORIENTED | PARAMETER 1 |
| ⋮ | PARAMETER 2 |
| BALANCE-ORIENTED | PARAMETER 3 |
| ⋮ | PARAMETER 4 |
| CHROMA-ORIENTED | PARAMETER 5 |

FIG. 8

| R | G | B | L | a | b |
|---|---|---|---|---|---|
| 0 | 0 | 0 | **** | **** | **** |
| 0 | 0 | 32 | **** | **** | **** |
| 0 | 0 | 64 | **** | **** | **** |
| ⋮ | ⋮ | ⋮ | **** | **** | **** |
| 64 | 128 | 160 | ⋮ | ⋮ | ⋮ |
| 64 | 128 | 192 | ⋮ | ⋮ | ⋮ |
| 64 | 128 | 224 | ⋮ | ⋮ | ⋮ |
| ⋮ | ⋮ | ⋮ | ⋮ | ⋮ | ⋮ |
| 255 | 255 | 224 | ⋮ | ⋮ | ⋮ |
| 255 | 255 | 255 | **** | **** | **** |

F I G. 10
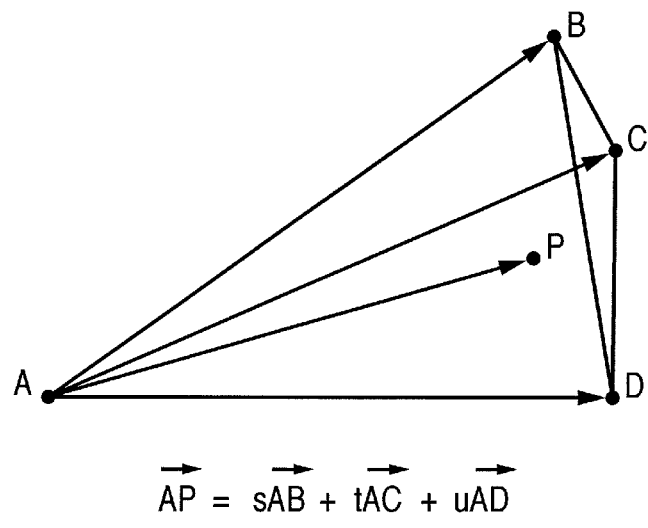

F I G. 16
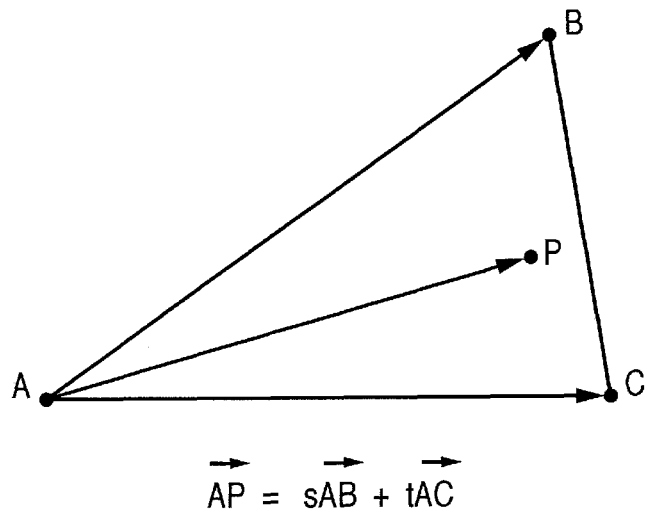
$\overrightarrow{AP} = s\overrightarrow{AB} + t\overrightarrow{AC}$

FIG. 24

| MAXIMUM CHROMA | COLOR CONVERSION PARAMETER |
|---|---|
| Cmax < 50 | PARAMETER 1 |
| 50 ≦ Cmax < 70 | PARAMETER 2 |
| 70 ≦ Cmax < 90 | PARAMETER 3 |
| 90 ≦ Cmax < 110 | PARAMETER 4 |
| 110 ≦ Cmax | PARAMETER 5 |

COLOR PROCESSING METHOD AND APPARATUS THEREOF

BACKGROUND OF THE INVENTION

1. Field of the Invention

The present invention relates to color processing for mapping image data on an output color gamut.

2. Description of the Related Art

Along with the popularization of personal computers, many people use image input devices such as digital cameras and image scanners. Therefore, opportunities to input an image by an image input device, to display that image on an image display device such as a CRT, LCD, or the like, and to output the image using an image output device such as a printer or the like are increasing. In this case, color matching processing (gamut mapping) is required to correct image perception differences due to different color gamuts among the image input, display, and output devices. That is, the color matching processing absorbs color perception differences among devices.

As one method of gamut mapping, so-called calorimetric processing is known. The calorimetric processing expresses a color gamut common to an input device and output device intact. As for a non-common color gamut, the processing maps colors of the input device on a boundary surface of a color gamut of the output device (to be referred to as "output color gamut" hereinafter).

Various techniques of mapping methods have been proposed. For example, a method of checking if an input color falls within an output color gamut, and mapping a color outside the output color gamut at a nearest neighboring point of the boundary surface of the output color gamut, a method of mapping a color outside the output color gamut at a point having the same lightness and hue values and a maximum chroma value, and the like are available. With the former method, the hue of the color outside the output color gamut changes, and one may feel discrepancy in the color of an output image. With the latter method, the lightness and hue are maintained, but the chroma lowers considerably depending on the compressed color gamut of the input device (to be referred to as "input color gamut" hereinafter), and one may feel an unnatural image. Furthermore, both these methods completely ignore the tonality of colors outside the output color gamut.

To solve such problem, for example, as described in E. G. Pariser, "An Investigation of Color Gamut Reduction Techniques", IS & T Symp. Elec. Prepress Tech.-Color Printing, pp. 105-107 (1991), a mapping method based on a focal point scheme that executes gamut mapping toward one point (50, 0, 0) on the gray axis on the CIELAB space has been proposed. Also, Japanese Patent Laid-Open No. 8-046776 (U.S. Pat. No. 5,745,263) describes a method of adaptively setting a focal point (mapping convergent point). An upper limit and lower limit are set on the lightness axis of the output color gamut. When the lightness of an input point is larger than the upper limit, the upper limit is set as a focal point. On the other hand, when the lightness of an input point is lower than the lower limit, the lower limit is set as a focal point. When the lightness of an input point falls between the upper limit and lower limit, a point on the lightness axis having the same lightness as the input point is set as a focal point.

Many mapping methods in the calorimetric processing have been proposed. However, since the above two methods preserve hues of out-of-gamut colors and express tones albeit slightly, an output image which is less unnatural is obtained. However, since the mapping method based on the focal point scheme uniquely determines a mapping direction, it cannot cope with a mapping mode that the user requires and it cannot perform proper mapping when the output color gamut is changed. For example, assume that the user requires chroma-oriented mapping that reduces a chroma difference before and after the mapping or lightness-oriented mapping that reduces a lightness difference before and after the mapping. In this case, the above two methods cannot switch the focal point, and cannot meet the user's requirement.

The output color gamut of an output device often largely changes depending on the combinations of media and inks. For example, for a medium such as glossy paper that can output high-chroma colors, a chroma difference before and after the mapping is not so large even when mapping is made while maintaining the lightness of an input color. Therefore, it is desirable to set the focal point for lightness-oriented mapping. On the other hand, in case of a medium such as plain paper that can only output low-chroma colors, a chroma difference before and after the mapping becomes very large if mapping is made while maintaining the lightness of an input color. Therefore, a better image can be obtained by setting the focal point for mapping that attaches importance to chroma rather than lightness. The above two methods cannot cope with switching of mapping methods corresponding to such change in output color gamut.

SUMMARY OF THE INVENTION

According to an aspect of the present invention, a color processing apparatus includes: a determining section, arranged to determine a gamut mapping mode in accordance with a user instruction; an obtaining section, arranged to obtain a color gamut of an output device; a setting section, arranged to set a moving range of a focal point in accordance with the gamut mapping mode; and a mapping section, arranged to perform gamut mapping based on the color gamut of the output device and the moving range of the focal point. The gamut mapping mode includes a lightness-oriented mode and a chroma-oriented mode, the moving range of the focal point in the lightness-oriented mode is larger than that in the chroma-oriented mode. The mapping section sets the focal point corresponding to input color in the moving range, and maps the input color into the color gamut of the output device using the set focal point.

According to this aspect, upon mapping an image on the output color gamut, color processing that preserves the hue and tone values of the image data which fall outside the output color gamut and meets a color conversion request of the user can be executed.

According to another aspect of the present invention, a color processing method obtains a color gamut of an output device, detects a maximum chroma of the color gamut of the output device, sets a moving range of a focal point based on the maximum chroma, calculates the focal point for input color in the moving range, and performs gamut mapping on the input color based on the calculated focal point and the color gamut of the output device.

According to this aspect, upon mapping an image on the output color gamut, color processing that preserves the hue and tone values of the image data which fall outside the output color gamut and can adjust to a change in output color gamut can be executed.

According to another aspect of the present invention, a color processing apparatus includes: an obtaining section, arranged to obtain a color gamut of an output device; a detector, arranged to detect a maximum chroma of the color gamut of the output device; a setting section, arranged to set a moving range of a focal point based on the maximum chroma; a calculator, arranged to calculate the focal point for input color in the moving range; and a mapping section, arranged to perform gamut mapping on the input color based on the calculated focal point and the color gamut of the output device.

According to another aspect of the present invention, a color processing method includes: obtaining a color gamut of an output device; detecting a maximum chroma of the color gamut of the output device; setting a moving range of a focal point based on the maximum chroma; calculating the focal point for input color in the moving range; and performing gamut mapping on the input color based on the calculated focal point and the color gamut of the output device.

Further features of the present invention will become apparent from the following description of exemplary embodiments with reference to the attached drawings.

BRIEF DESCRIPTION OF THE DRAWINGS

FIG. 6 shows an example of a parameter correspondence table;

FIG. 8 shows an exemplary data format of an output color gamut held in a memory;

FIG. 10 illustrates inside/outside determination using tetrahedrons;

FIG. 16 illustrates inside/outside determination using triangular patches;

FIG. 24 shows an example of a parameter correspondence table.

DESCRIPTION OF THE EMBODIMENTS

Color processing according to exemplary embodiments of the present invention will be described in detail hereinafter with reference to the accompanying drawings.

First Embodiment

[Arrangement of Image Processing Apparatus]

Figure 1:
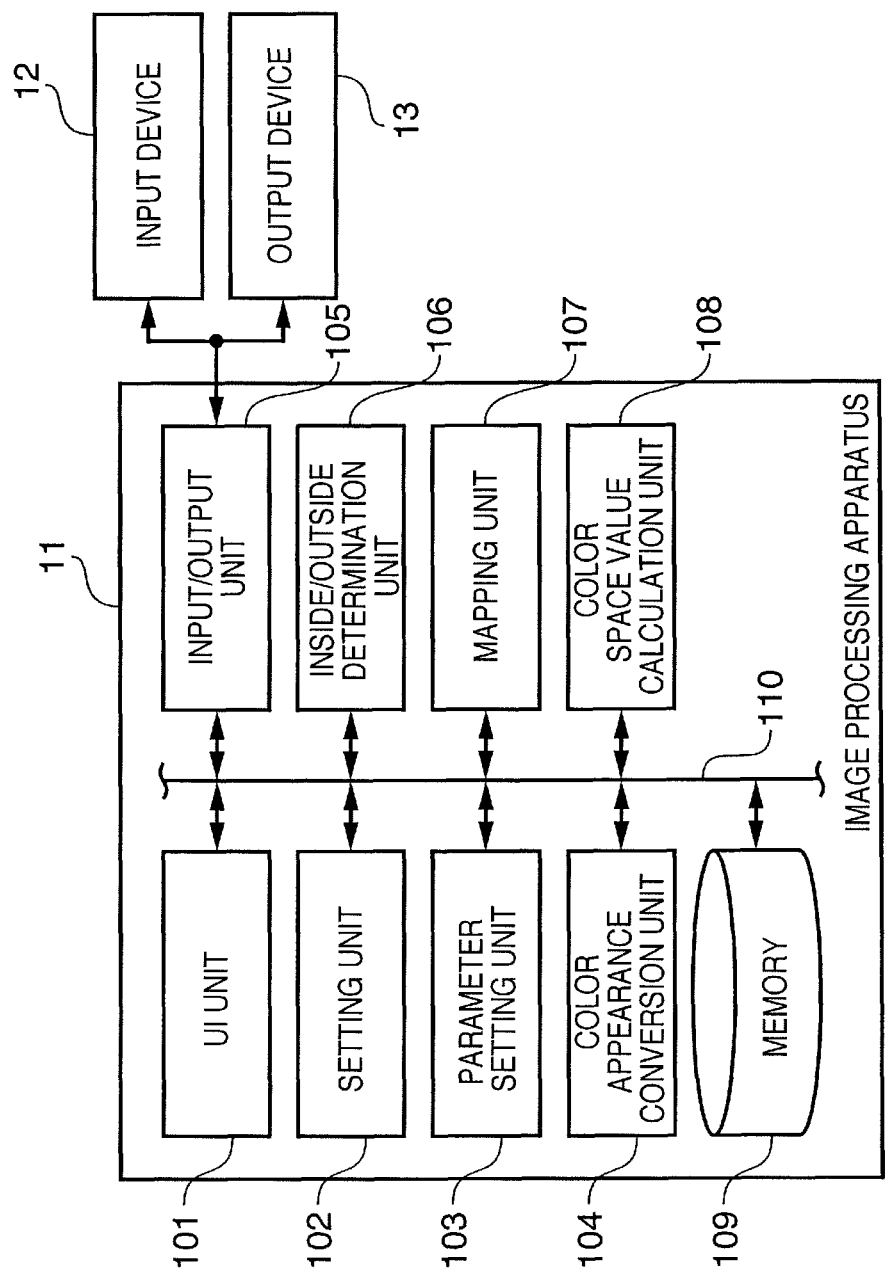
FIG. 1 is an exemplary block diagram showing an arrangement of an image processing apparatus.

FIG. 1 is a block diagram showing the arrangement of an image processing apparatus 11 of this exemplary embodiment.

The user inputs designation of an input image, the output destination of the image, the color gamuts of devices, a conversion mode, and the like by operating a mouse and keyboard (not shown) of a user interface (UI) unit 101. An input/output unit 105 is a general-purpose interface or network interface such as USB, IEEE1394, or the like. The input/output unit 105 inputs an image designated by the user from an input device 12, and outputs the image that has undergone color processing to the output destination (e.g., an output device 13). Note that the input source and output destination of an image are not limited to the input device 12 and output device 13, and a storage medium inserted in a card reader, a server connected to a network, and the like may be used.

A setting unit 102 sets color conversion according to a user's request. A color conversion parameter setting unit 103 sets color conversion parameters in accordance with the set color conversion mode. A color appearance conversion unit 104 converts the RGB values of the input image, which is input via the input/output unit 105 and is stored into a memory 109, into color appearance values (Lab values) using a color appearance model.

An inside/outside determination unit 106 determines whether or not the Lab values output from the color appearance conversion unit 104 fall within an output color gamut (e.g., the color gamut of the output device 13) designated by the user. A mapping unit 107 maps the Lab values output from the color appearance conversion unit 104 into the output color gamut. A color space value calculation unit 108 calculates, e.g., output device color values based on the Lab values after mapping. For example, if the output destination of the image is the output device 13, which comprises a printer, the color space value calculation unit 108 converts the Lab values after mapping into device CMYK values.

Note that the above components are connected to each other via a system bus 110. Also, the memory 109 comprises a RAM or hard disk which is used as a work memory that stores an image and data during processing.

[Operation of Image Processing Apparatus]

Figure 2:
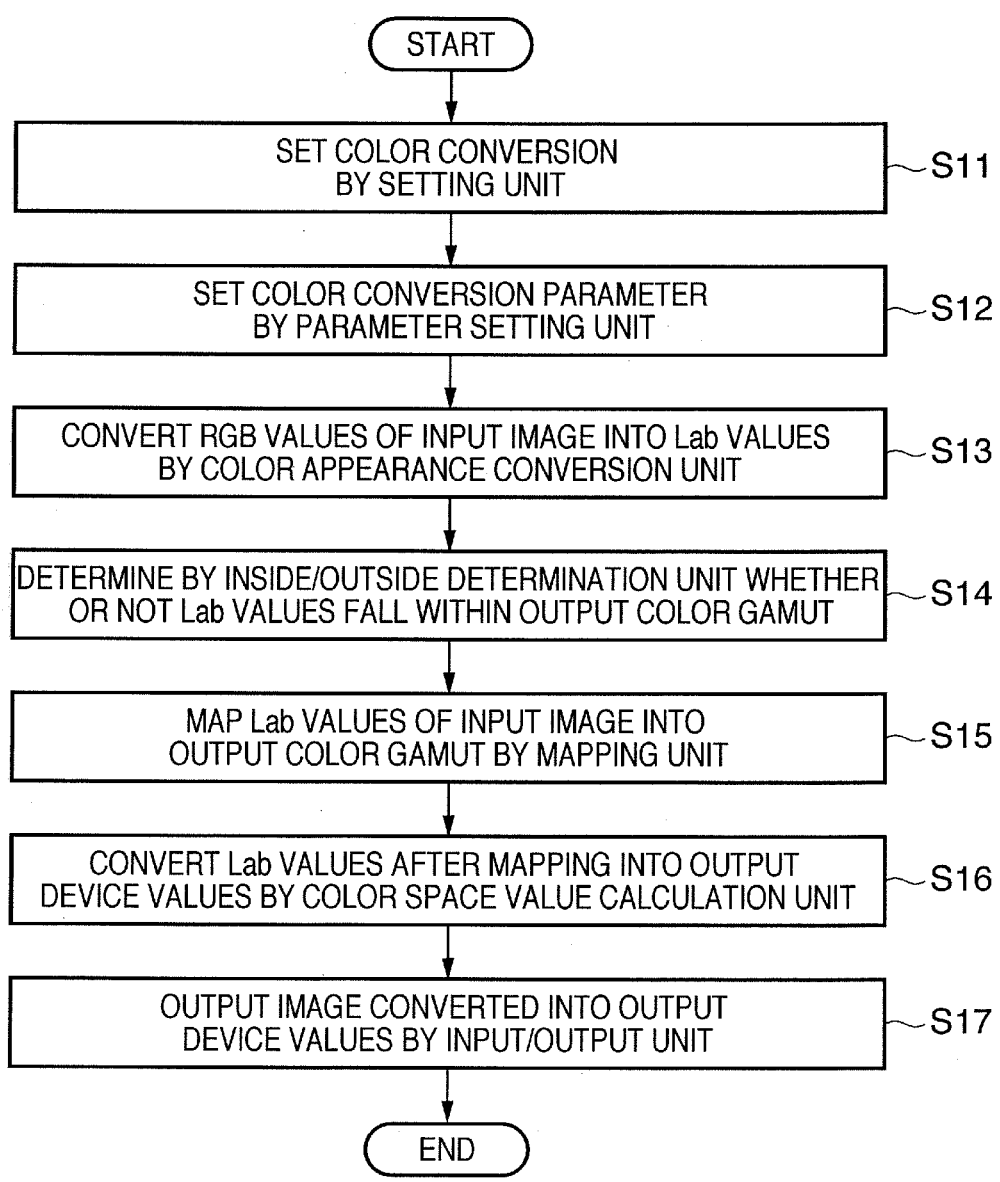
FIG. 2 is a flowchart illustrating processing executed by the image processing apparatus.

FIG. 2 is a flowchart illustrating processing executed by the image processing apparatus 11. This processing is executed when the user inputs a request associated with color conversion such as designation of an input image, the output destination of the image, the color gamuts of the devices, the color conversion mode, and then inputs a start instruction of the processing. Note that details of the processes in respective steps to be described below will be described later.

The setting unit 102 sets color conversion according to a user's request (S11). The parameter setting unit 103 sets color conversion parameters in accordance with the set color conversion mode (S12).

The color appearance conversion unit 104 converts the RGB values of the input image stored in the memory 109 into Lab values (S13). The inside/outside determination unit 106 determines whether or not the Lab values of the input image obtained in step S13 fall within the output color gamut, and stores the determination result in the memory 109 (S14).

The mapping unit 107 maps the Lab values of the input image into the output color gamut with reference to the inside/outside determination result stored in the memory 109 (S15). The color space value calculation unit 108 converts the Lab values after mapping into output device values (S16). The input/output unit 105 outputs the image, which is stored in the memory 109 and is converted into the output device values, to the output destination (S17).

[User Interface]

Figure 3:
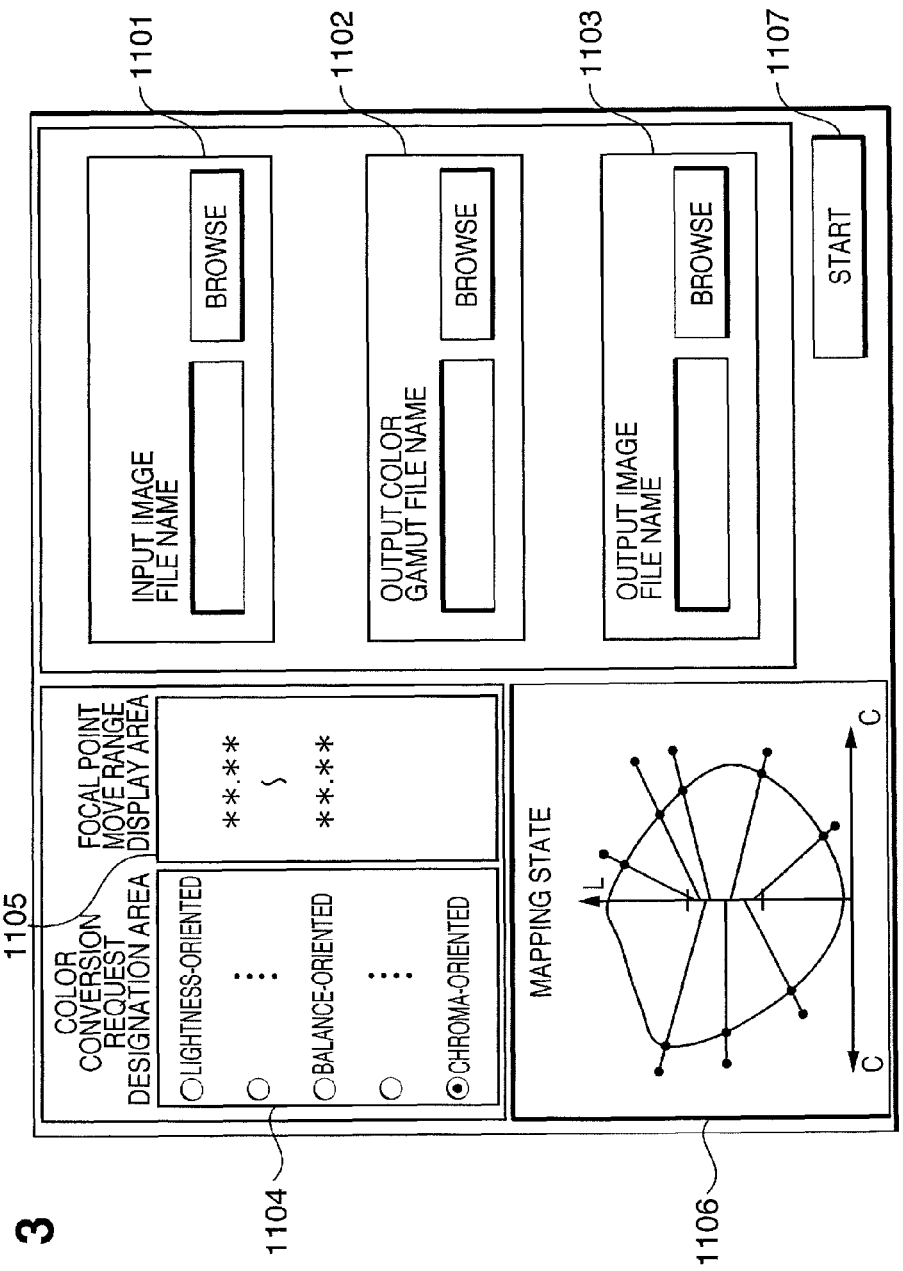
FIG. 3 shows an example of a user interface (UI) provided by a UI unit.

FIG. 3 shows an example of a user interface provided by the UI unit 101.

The user sets a file name of an input image in an input image designation field 1101, sets a file name that describes the color gamut of the output device in an output color gamut file designation field 1102, and sets a file name indicating the output destination of a converted image in an output image file designation field 1103. The user sets a color conversion mode using a color conversion request designation area 1104. Upon completion of these settings, the user presses a start button 1107 to input a start instruction of color processing.

A focal point move range display area 1105 displays the moving range of a focal point used in gamut mapping. A mapping state display area 1106 displays the state of gamut mapping.

FIG. 3 exemplifies a lightness-oriented mode, balance-oriented mode, and chroma-oriented mode as color conversion modes. Furthermore, an intermediate mode between the lightness-oriented mode and balance-oriented mode, and that between the balance-oriented mode and chroma-oriented mode are added, and the user can select a desired one of five different types of color conversion modes. The types of color conversion modes are not limited to these five types.

[Setting Unit]

Figure 4:
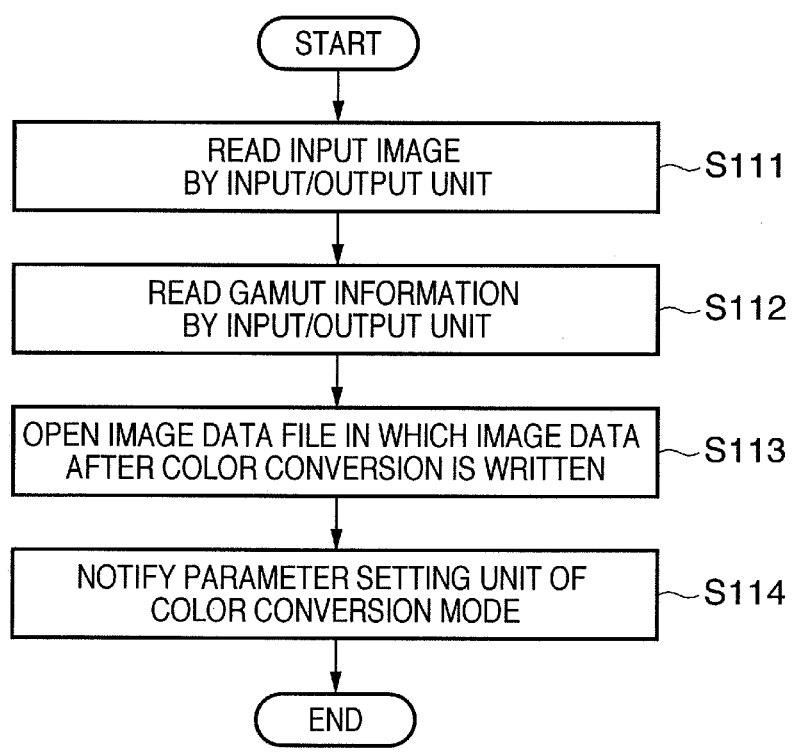
FIG. 4 is a flowchart showing processing of a setting unit.

FIG. 4 is a flowchart showing processing of the setting unit 102.

The input/output unit 105 reads a designated image file (S111) and also a color gamut file (S112), and stores these files in the memory 109. Furthermore, the input/output unit 105 opens on the memory 109 an image data file with the file name designated by the user (S113), and notifies the parameter setting unit 103 of the color conversion mode set by the user (S114).

[Parameter Setting Unit]

Figure 5:
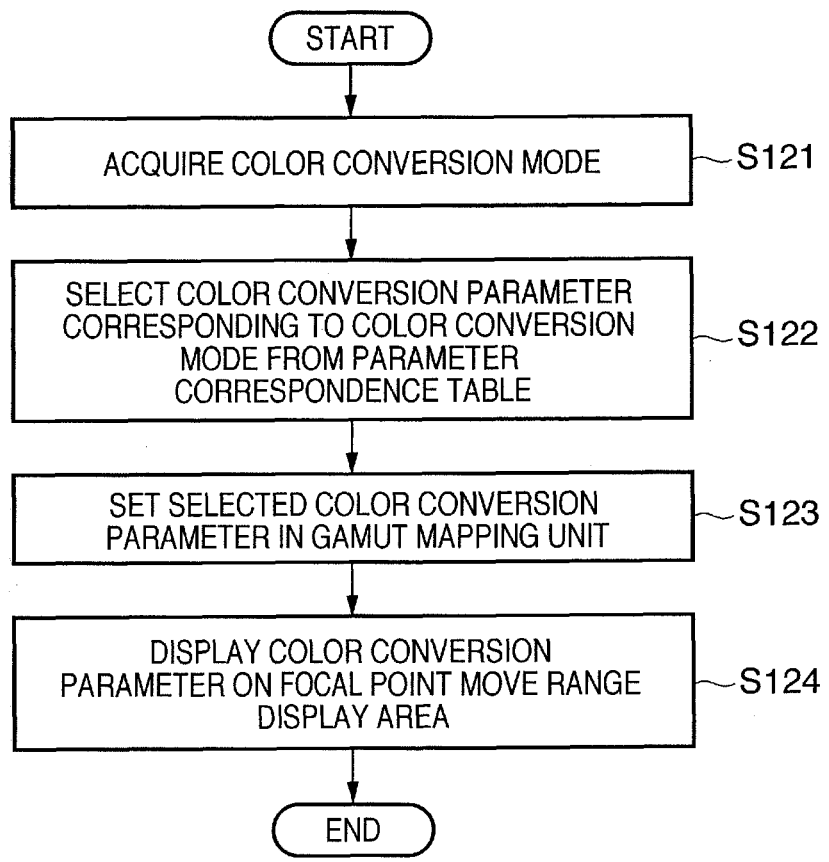
FIG. 5 is a flowchart showing processing of a parameter setting unit.

FIG. 5 is a flowchart showing processing of the parameter setting unit 103.

The parameter setting unit 103 acquires the color conversion mode (S121), and selects color conversion parameters corresponding to the color conversion mode with reference to a parameter correspondence table (FIG. 6) which is held in advance (S122).

As shown in FIG. 6, the parameter correspondence table describes color conversion parameters required to implement each of the color conversion modes selectable in the color conversion request designation area 1104. Details of the color conversion parameters will be described later.

The parameter setting unit 103 sets the selected color conversion parameters in the gamut mapping unit 107 (S123), and displays the color conversion parameters on the focal point move range display area 1105 of the display shown in FIG. 3 displayed by the UI unit 101 (S124).

[Color Appearance Conversion Unit]

Figure 7:
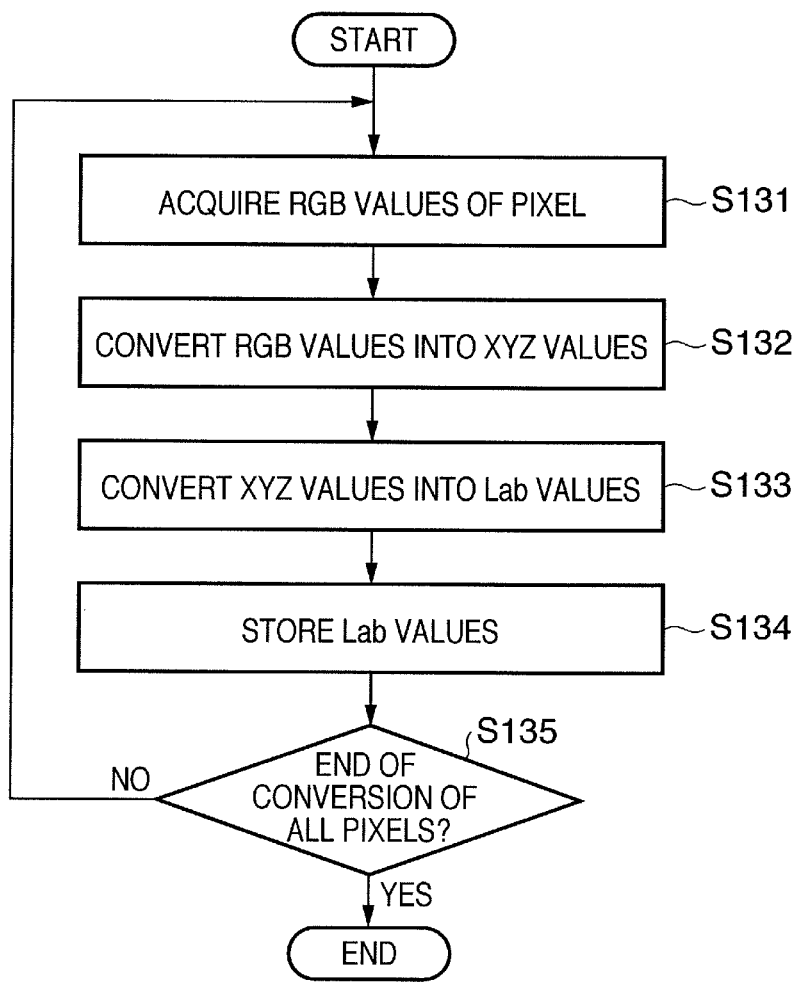
FIG. 7 is a flowchart showing processing of a color appearance conversion unit.

FIG. 7 is a flowchart showing processing of the color appearance conversion unit 104.

The color appearance conversion unit 104 acquires the RGB values of one pixel from the input image stored in the memory 109 (S131), and converts the acquired RGB values into CIEXYZ values (tristimulus values) (S132). Note that conversion formulas unique to the color space that expresses the image are used. In this embodiment, an sRGB color space will be described as the color space. Formulas (1) are used to convert RGB values on the sRGB color space into XYZ values.

$$R' = R/255 \qquad (1)$$

$$G' = G/255$$

$$B' = B/255$$

If $R'$, $G'$, and $B' \leq 0.04045$, $$R'' = R'/12.92$$

$$G'' = G'/12.92$$

$$B'' = B'/12.92$$

If $R'$, $G'$, and $B' > 0.04045$, $$R'' = \{(R' + 0.055)/1.055\}^{2.4}$$

$$G'' = \{(G' + 0.055)/1.055\}^{2.4}$$

$$B'' = \{(B' + 0.055)/1.055\}^{2.4}$$

$$\begin{bmatrix} X \\ Y \\ Z \end{bmatrix} = \begin{bmatrix} 0.4124 & 0.3576 & 0.1805 \\ 0.2126 & 0.7152 & 0.0722 \\ 0.0193 & 0.1192 & 0.9505 \end{bmatrix} \begin{bmatrix} R'' \\ G'' \\ B'' \end{bmatrix}$$

The color appearance conversion unit 104 converts the calculated XYZ values into color values on a color appearance space (S133). Assume that the color appearance space is the CIELAB space. Formulas (2) are required to convert the XYZ values into Lab values.

If $Y/Yn > 0.00856, L^* = 116(Y/Yn)^{1/3} - 16$

If $Y/Yn \leq 0.00856, L^* = 903.29(Y/Yn)$ $a^* = 500\{f(X/Xn) - f(Y/Yn)\}$ $b^* = 500\{f(Y/Yn) - f(Z/Zn)\}$ for if $X/Xn > 0.008856, f(X/Xn) = (X/Xn)^{1/3}$ if $X/Xn \leq 0.008856, f(X/Xn) = 7.78(X/Xn) + 16/116$ if $Y/Yn > 0.008856, f(Y/Yn) = (Y/Yn)^{1/3}$ if $Y/Yn \leq 0.008856, f(Y/Yn) = 7.78(Y/Yn) + 16/116$ if $Z/Zn > 0.008856, f(Z/Zn) = (Z/Zn)^{1/3}$ if $Z/Zn \leq 0.008856, f(Z/Zn) = 7.78(Z/Zn) + 16/116$ (2)

Xn, Yn, Zn: XYZ values of a white point

In this embodiment, since the color space used to express the input image is the sRGB color space, D65 is used as the white point used in conversion. In case of D65, Xn=95.05, Yn=100.0, and Zn=108.91 in formulas (2).

The color appearance conversion unit 104 then stores the Lab values as the calculation result in the memory 109 (S134), and checks if all pixels of the input image have undergone the color appearance conversion (S135). If pixels to be processed still remain (NO in S135), the process returns to step S131, and the color appearance conversion unit 104 repeats the processes n steps S131 to S134 until all the pixels are converted.

[Inside/Outside Determination Unit]

Figure 9:
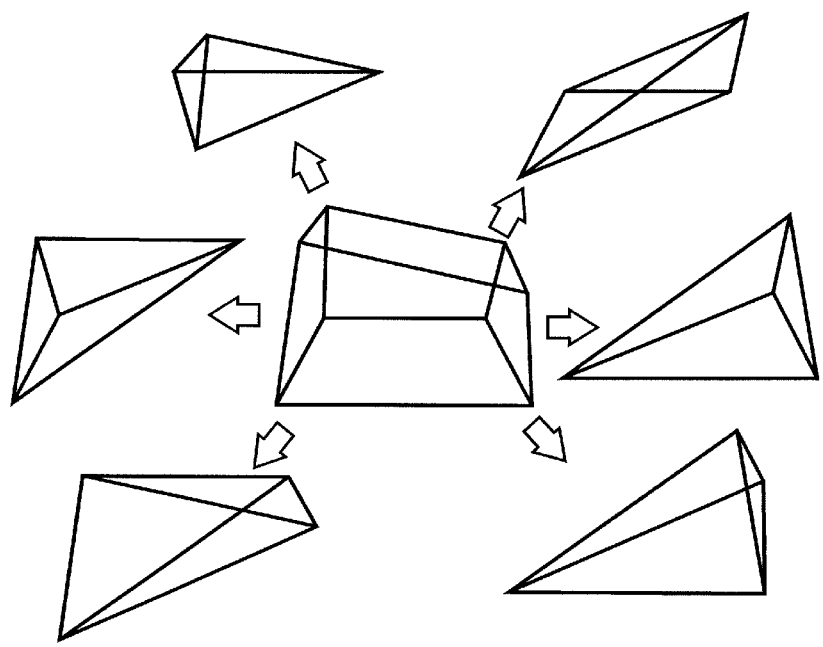
FIG. 9 shows a state wherein a hexahedron is divided into tetrahedrons.

FIG. 8 shows the data format of the output color gamut held in the memory 109. As shown in FIG. 8, this data format describes the RGB values (729 colors) of grid points obtained by slicing the ranges $0 \leq R, G, B \leq 255$ into nine, and color appearance values obtained by inputting these RGB values into the output device. That is, FIG. 8 shows data obtained based on the colorimetry results of patches output from the output device by supplying the RGB values of the grid points to the output device as patch data. In other words, the color gamut of the output device is formed of data at 729 grid points, i.e., 512 hexahedrons. Therefore, the inside/outside determination of the color gamut can be implemented by checking whether or not the Lab values of an input pixel are included in any of 512 hexahedrons. Note that the hexahedron is divided into six tetrahedrons (see FIG. 9), and this embodiment performs the inside/outside determination using these tetrahedrons.

FIG. 10 illustrates inside/outside determination using tetrahedrons. As shown in FIG. 10, let A, B, C, and D be the vertices of a tetrahedron, and P be an input value. Then, the relationship among these points is expressed by:

$$\vec{AP} = s\vec{AB} + t\vec{AC} + u\vec{AD} \quad (3)$$

where $\vec{AP}$ is a vector from point A to point P.

If point P is included in the tetrahedron ABCD, inequalities (4) hold:

$$s + t + u \leq 1$$

$$s \geq 0, t \geq 0, u \geq 0 \quad (4)$$

Therefore, if inequalities (4) hold, it is determined that point P is located in a tetrahedron. When such inside/outside determination using a tetrahedron is made for six tetrahedrons, that of a given hexahedron can be attained. Furthermore, when the inside/outside determination of a hexahedron is made for 512 hexahedrons, that of the output color gamut for given Lab value is completed.

In this way, the inside/outside determination results for respective pixels of the input image are stored in the memory 109 in correspondence with the pixel positions.

[Mapping Unit]

Figure 11:
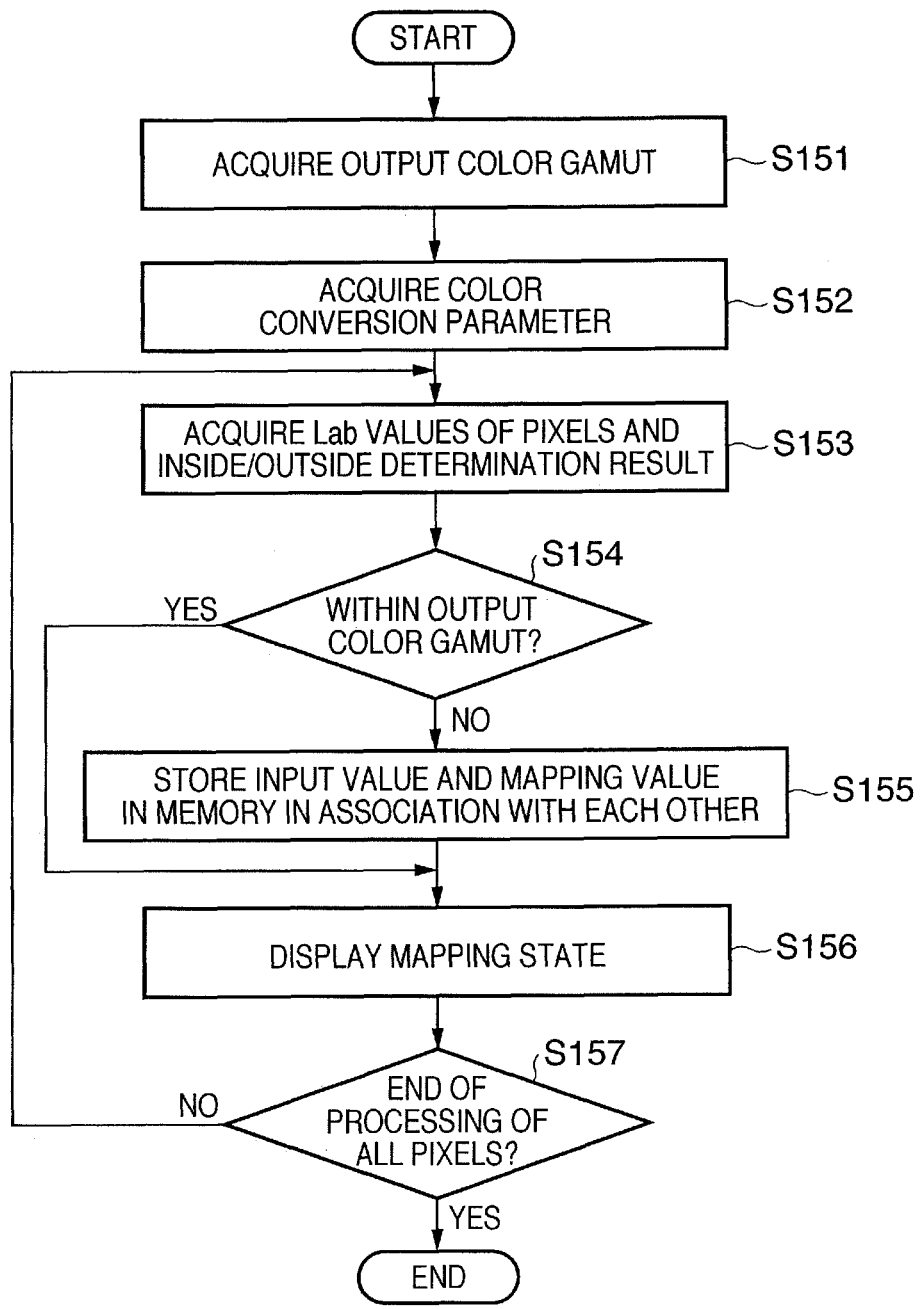
FIG. 11 is a flowchart showing processing of a mapping unit.

FIG. 11 is a flowchart showing processing of the mapping unit 107.

The mapping unit 107 acquires from the memory 109 the output color gamut (S151), the color conversion parameters (S152), and the Lab values of a pixel and its inside/outside determination result (S153). Let Li, ai, and bi be the Lab values of pixel number i.

The mapping unit 107 determines with reference to the inside/outside determination result if Li, ai, and bi fall within the output color gamut (S154). If the mapping unit 107 determines that Li, ai, and bi fall outside the output color gamut (NO in S154), it calculates a mapping point as a mapping destination of Li, ai, and bi, and stores the input point (Li, ai, bi) and mapping point in the memory 109 in association with each other (S155). Note that the mapping unit 107 does not map an input point falling within the output color gamut.

Figure 12:
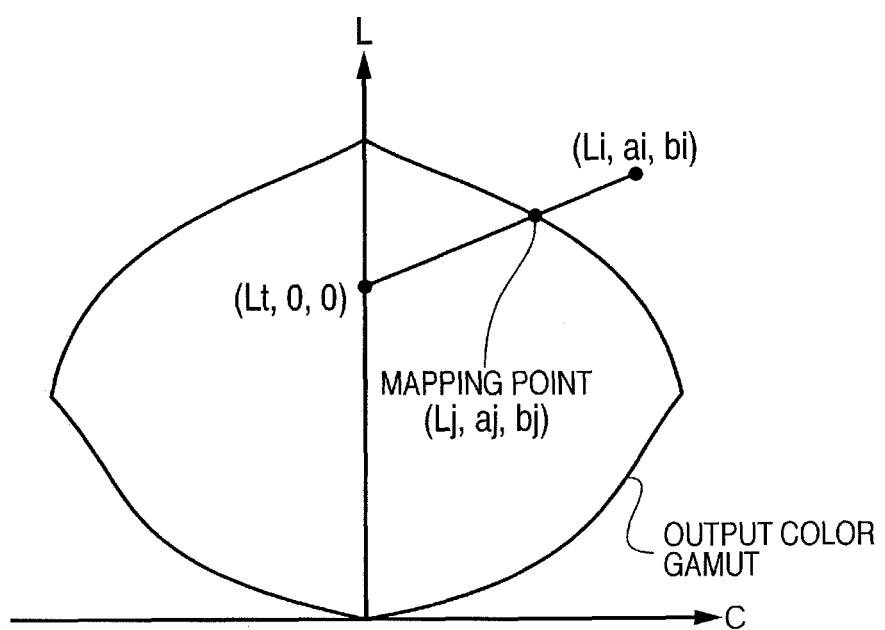
FIG. 12 is a graph showing a mapping method.

FIG. 12 shows the mapping method in step S155.

The mapping unit 107 sets a point (Lt, 0, 0) on the achromatic axis of the color appearance space as a focal point. The mapping unit 107 maps the input point (Li, ai, bi) at an intersection (Lj, aj, bj) between a line segment which connects the input point (Li, ai, bi) and focal point (Lt, 0, 0), and the boundary surface of the output color gamut. Note that the lightness Lt of the focal point assumes a value determined depending on the lightness Li of the input point and color conversion parameters Lmax and Lmin, and is calculated, e.g., by:

$$Lt = (Lmax - Lmin) \cdot Li / 100 + Lmin \quad (5)$$

Figure 13:
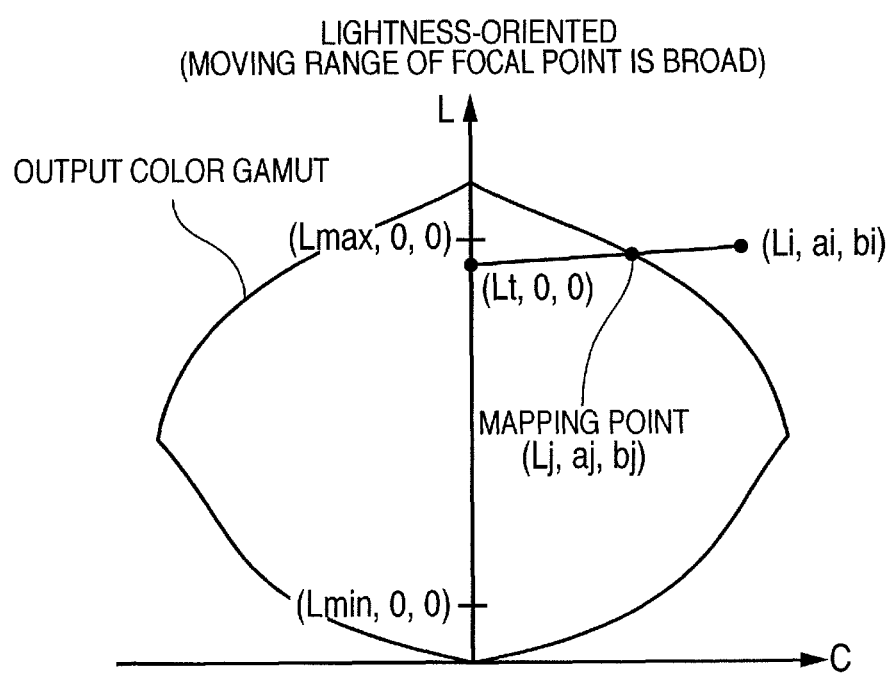
FIG. 13 is a graph illustrating lightness-oriented mapping.
Figure 14:
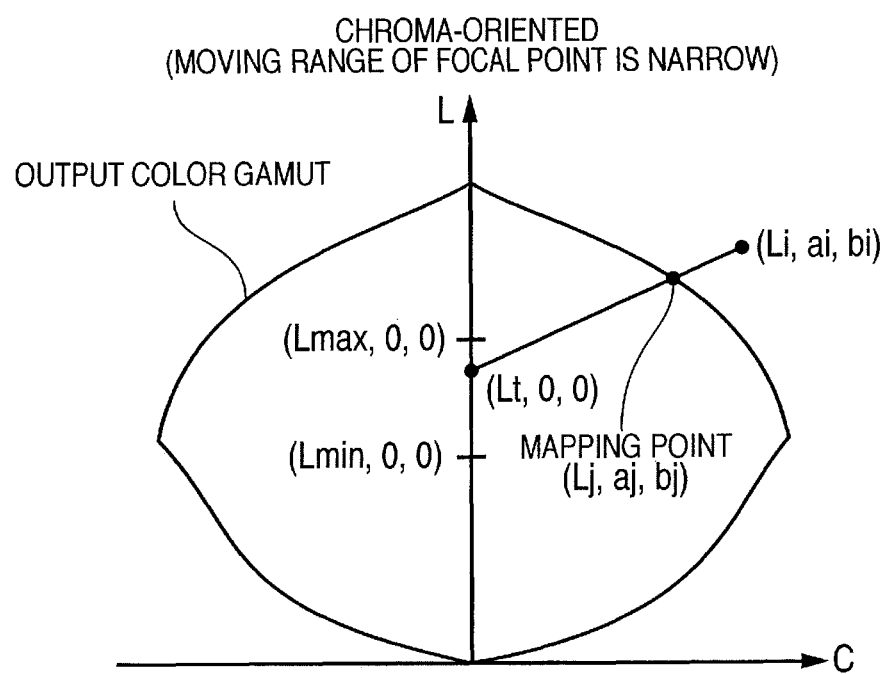
FIG. 14 is a graph illustrating chroma-oriented mapping.

According to equation (5), the focal point (Lt, 0, 0) on the achromatic axis moves between Lmin and Lmax depending on the lightness Li ($0 \leq Li \leq 100$) of the input point. The movement of the focal point is to obtain a satisfactory tone upon mapping an out-of-gamut color. If the difference between Lmin and Lmax is large, the focal point (Lt, 0, 0) moves within a broad range on the achromatic axis, and mapping using the focal point becomes lightness-oriented mapping (see FIG. 13). On the other hand, if the difference between Lmin and Lmax is small, the focal point (Lt, 0, 0) moves within a narrow range on the achromatic axis, and chroma-oriented mapping is attained (see FIG. 14).

The reason why the moving range of the focal point is controlled using the color conversion parameters Lmax and Lmin is to meet a user's requirement for color conversion such as lightness-oriented mapping, chroma-oriented mapping, balance-oriented mapping between these mapping modes, and the like. For example, when the user selects a chroma-oriented color conversion mode, the parameter setting unit 103 selects conversion parameters having Lmin and Lmax (the difference between them is small) corresponding to the chroma-oriented mode, thus executing chroma-oriented mapping.

An arithmetic operation method of the mapping point (Lj, aj, bj) as the mapping destination of the input point (Li, ai, bi) outside the output color gamut will be described below.

Arithmetic Operation Method of Mapping Point

Figure 15:
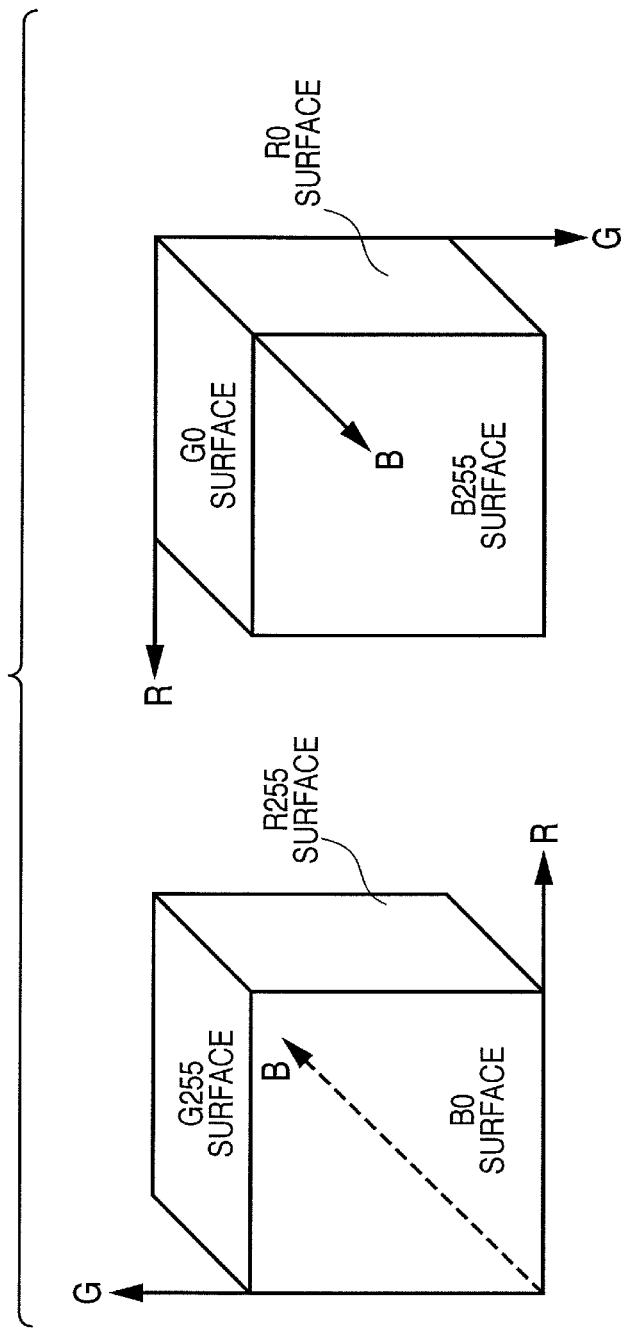
FIG. 15 illustrates a color gamut surface.

Any of RGB of each data corresponding to each boundary surface of the output color gamut has 0 or 255. That is, as shown in FIG. 15, the boundary surfaces are classified into six surfaces: a surface of R=255 (R255 surface), that of G=255 (G255 surface), that of B=255 (B255 surface), that of R=0 (R0 surface), that of G=0 (G0 surface), that of B=0 (B0 surface). Each surface is formed of 81 grid points, i.e., 128 triangular patches, and Lab values corresponding to the vertices of these triangular patches are acquired.

Next, the intersections between the 128 triangular patches of each surface and the line segment that connects the input point and focal point are calculated. The intersection can be easily calculated from an equation of a plane of each triangular patch, and that of the line segment. Note that this determination is a two-dimensional version of the aforementioned inside/outside determination using tetrahedrons. That is, as shown in FIG. 16, let A, B, and C be the vertices of a triangular patch, and P be an intersection. The relationship among these points is expressed by:

$$\vec{AP} = s\vec{AB} + t\vec{AC} \quad (6)$$

If point P is included in the triangular patch ABC, inequalities (7) hold:

$$s + t \leq 1$$

$$s \geq 0, t \geq 0 \quad (7)$$

Therefore, if inequalities (7) hold, it is determined that point P is included in that triangular patch, and an intersection (Lj, aj, bj) calculated from the equation of the plane of that triangular patch, and the equation of the line segment is determined as a mapping point.

Next, the mapping unit 107 displays the input point and that mapping point on the mapping state display area 1106 of the user interface display (FIG. 3) shown on the UI unit 101 together with the boundary of the output color gamut (S156). As shown in FIG. 3, if input points-mapping points-focal points are displayed by connecting them via line segments, the mapping state can be visually displayed plainly.

The mapping unit 107 checks if mapping of all pixels is completed (S157). The mapping unit 107 repeats steps S153 to S156 until mapping of all the pixels is completed.

[Color Space Value Calculation Unit]

Figure 17:
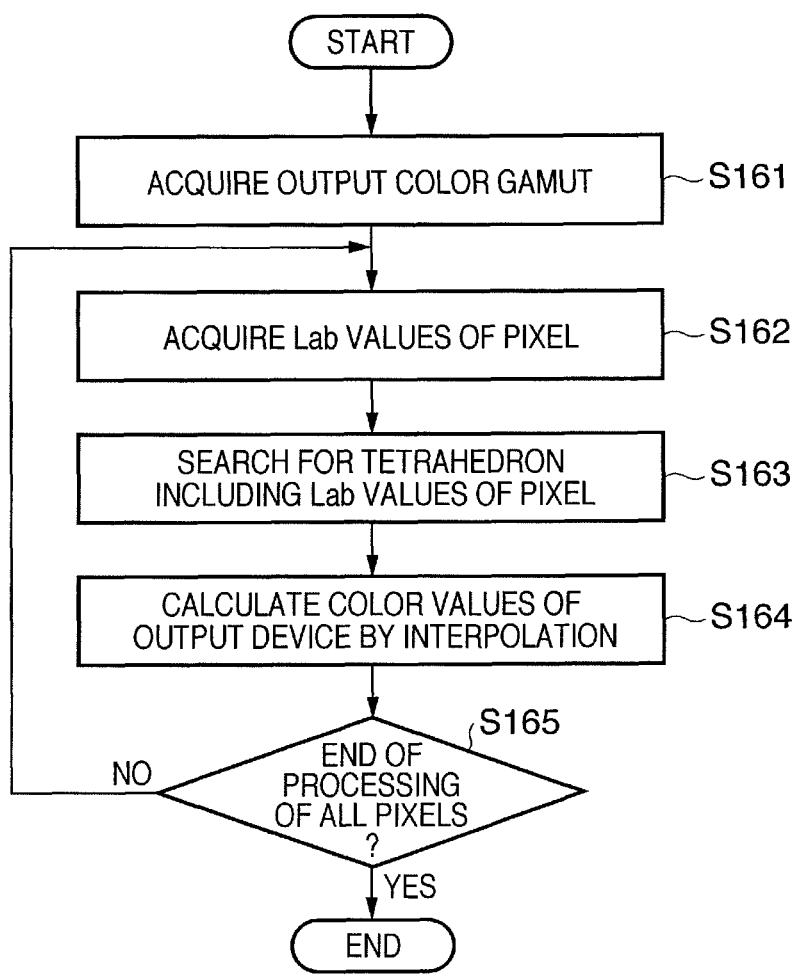
FIG. 17 is a flowchart showing processing of a color space value calculation unit.

FIG. 17 is a flowchart showing processing of the color space value calculation unit 108.

The color space value calculation unit 108 acquires from the memory 109 the output color gamut (S161) and the Lab values (Li, ai, bi or Lj, aj, bj) of a pixel (S162). The color space value calculation unit 108 searches the tetrahedrons of the output color gamut for that including the Lab values of the pixel (S163). The search method of a tetrahedron is the same as the aforementioned inside/outside determination using tetrahedrons, and a detailed description thereof will not be repeated. Then, the color space value calculation unit 108 calculates the device color values of the output color gamut corresponding to the Lab values of the pixel by interpolation, and stores the calculated device color values in the image data file opened on the memory 109 (S164).

As described above, points in a tetrahedron can be expressed by equation (3), and hold inequalities (4). Hence, device color values can be obtained by applying s, t, and u in equation (3) to:

$$R=Ra+s(Rb-Ra)+t(Rc-Ra)+u(Rd-Ra)$$

$$G=Ga+s(Gb-Ga)+t(Gc-Ga)+u(Gd-Ga)$$

$$B=Ba+s(Bb-Ba)+t(Bc-Ba)+u(Bd-Ba) \quad (8)$$

where Rx, Gx, and Bx (x=a, b, c, and d) are device color values at vertex X (X=A, B, C, and D).

When the output device is a CMYK device like a printer, and CMYK values are required, device RGB values are converted into device CMYK values using a conversion table or the like included in information of the output color gamut.

The color space value calculation unit 108 checks if the device color values have been calculated for all pixels of the input image (S165). If pixels to be processed still remain (NO in S165), the process returns to step S162, and the color space value calculation unit 108 repeats the processes in steps S162 to S164 until the processing of all the pixels is completed.

In this way, upon mapping the input image into the output color gamut using the calorimetric processing, mapping that considers (leaves) the tonality of the input point outside the output color gamut can be implemented by moving the focal point in accordance with the lightness of the input point. Also, by controlling the moving range of the focal point in accordance with the characteristics of mapping required by the user such as chroma-oriented mapping, lightness-oriented mapping, and the like, calorimetric mapping that meets the user's requirement can be implemented.

Second Embodiment

Image processing according to the second embodiment of the present invention will be described below. Note that the same reference numerals in the second embodiment denote the same components as those in the first embodiment, and a detailed description thereof will not be repeated.

[Arrangement of Image Processing Apparatus]

Figure 18:
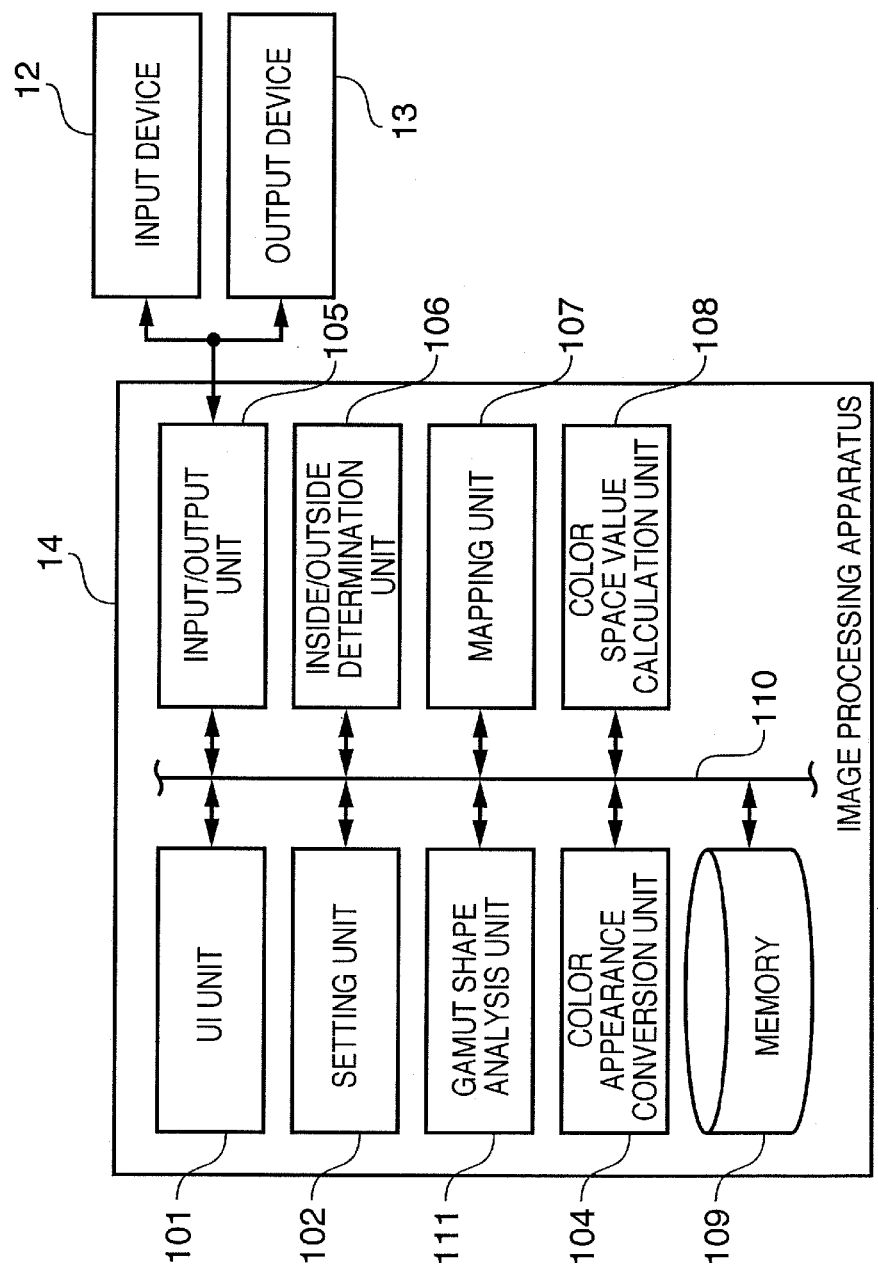
FIG. 18 is a block diagram showing an exemplary arrangement of an image processing apparatus.

FIG. 18 is a block diagram showing the arrangement of an image processing apparatus 14 according to the second embodiment. Unlike in the image processing apparatus 11 shown in FIG. 1, the image processing apparatus 14 includes a gamut shape analysis unit 111 which analyzes the shape of the output color gamut. The gamut shape analysis unit 111 sets color conversion parameters suited to the analysis result (the shape of the output color gamut).

[Operation of Image Processing Apparatus]

Figure 19:
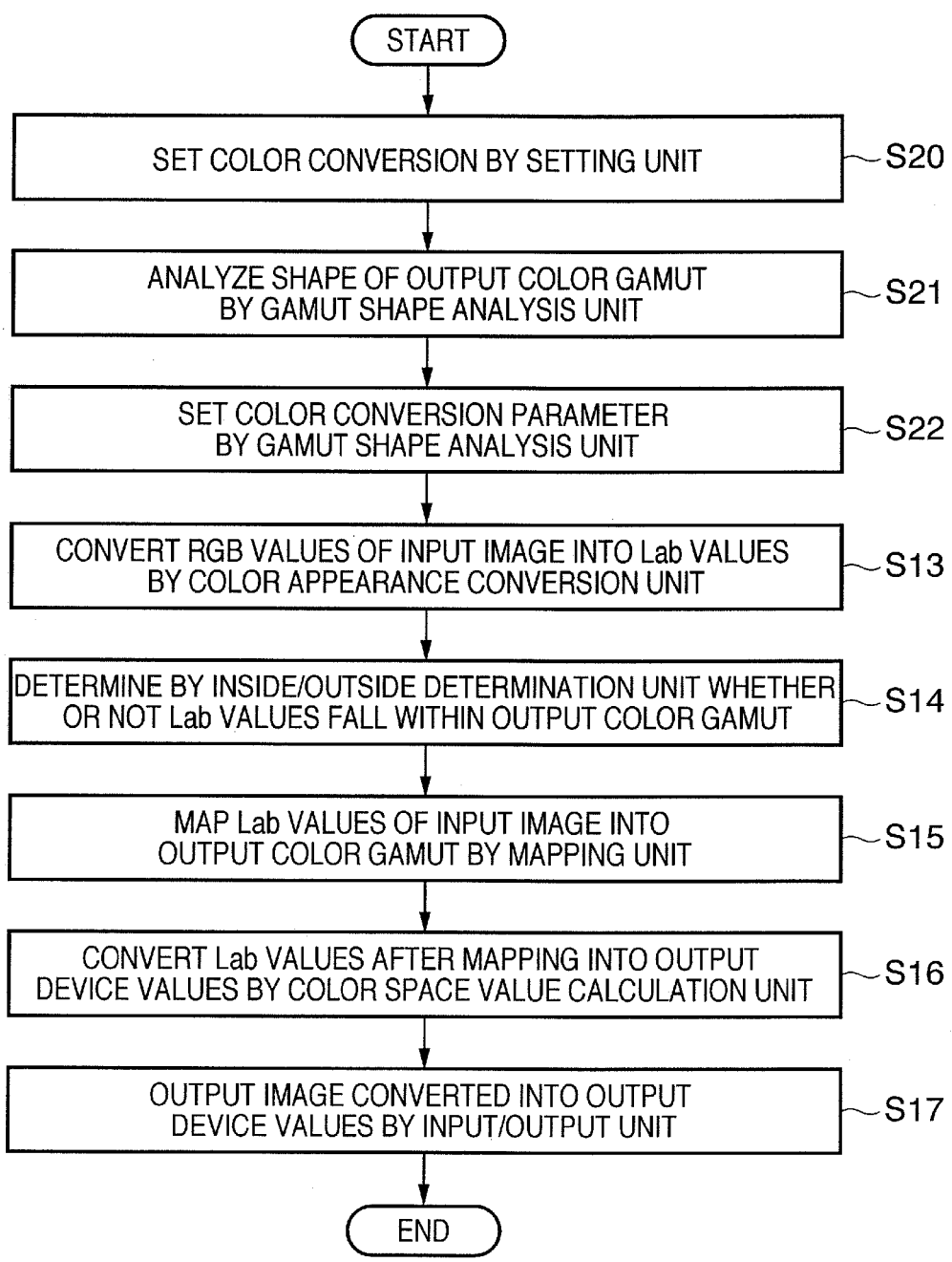
FIG. 19 is a flowchart illustrating processing executed by the image processing apparatus.

FIG. 19 is a flowchart illustrating processing executed by the image processing apparatus 14. This processing is executed when the user inputs a request associated with color conversion such as designation of an input image, the output destination of the image, the color gamuts of the devices, the color conversion mode, and then inputs an instruction for the start of the processing.

The setting unit 102 sets color conversion according to a user's request (S20). The gamut shape analysis unit 111 analyzes the shape of the set output color gamut (S21), and sets color conversion parameters according to the shape of the output color gamut (S22). Note that details of these processes will be described later. Also, since the subsequent processes (step S13 to S17) are the same as those in FIG. 2 of the first embodiment, they are denoted by the same step numbers, and a detailed description thereof will not be repeated.

[User Interface]

Figure 20:
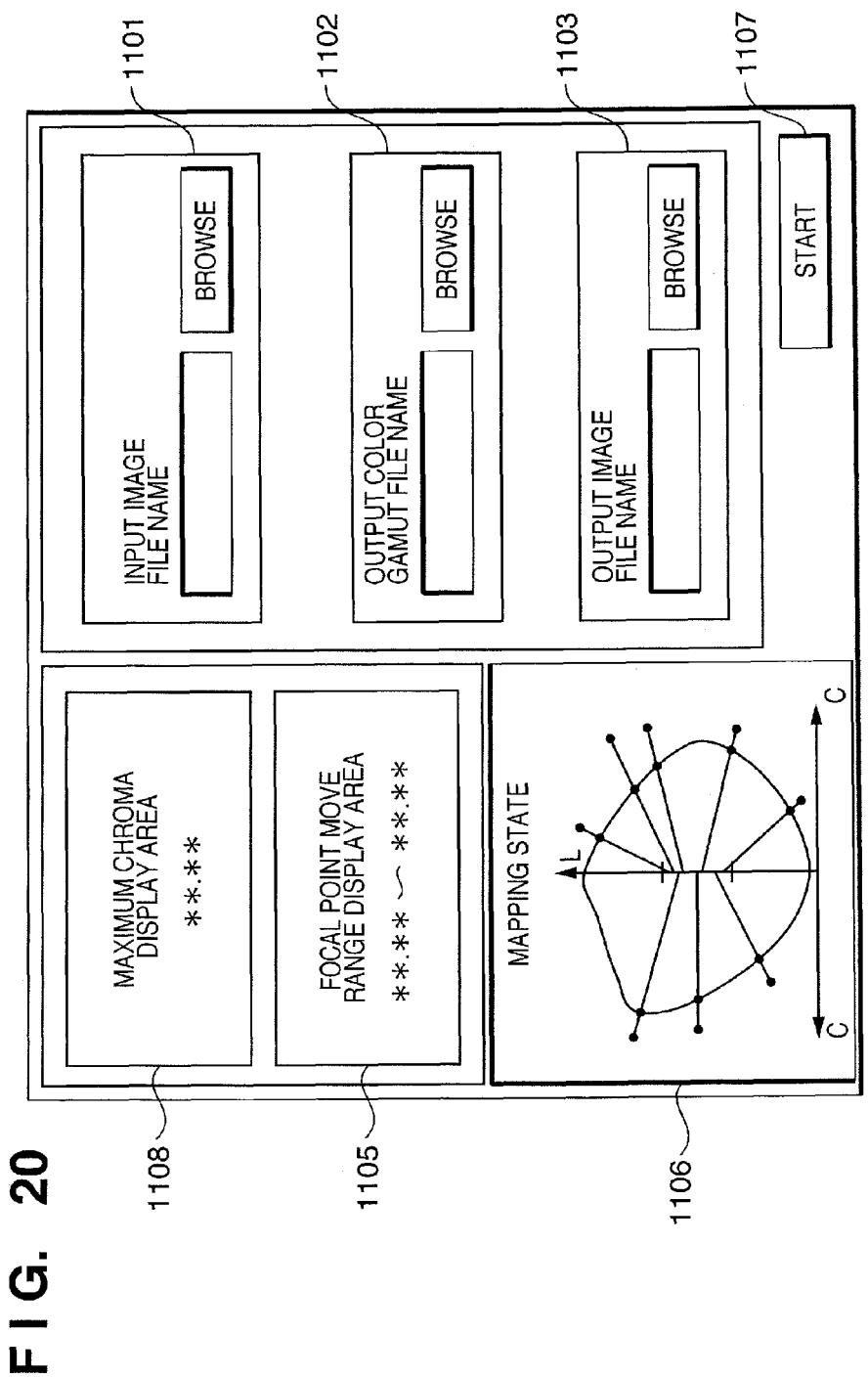
FIG. 20 shows an example of a user interface provided by a UI unit.

FIG. 20 shows an example of a user interface of the second embodiment provided by the UI unit 101. Unlike in the user interface shown in FIG. 3, the color conversion request designation area 1104 is omitted, and a maximum chroma display area 1108 that displays a maximum chroma value of the output color gamut analyzed by the gamut shape analysis unit 111 is added.

[Setting Unit]

Figure 21:
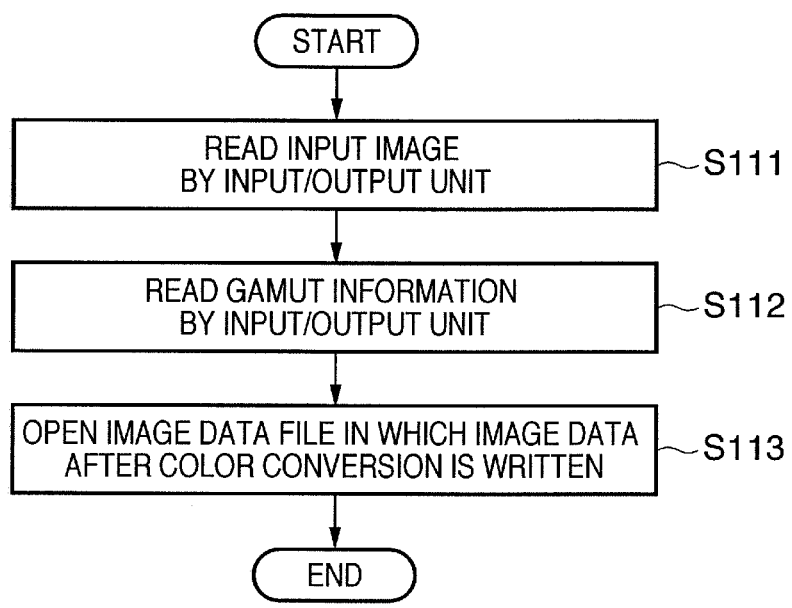
FIG. 21 is a flowchart showing processing of a setting unit.

FIG. 21 is a flowchart showing the processing of the setting unit 102. Unlike in the processing shown in FIG. 4, the process (S114) that notifies the parameter setting unit 103 of the color conversion mode set by the user is omitted.

[Gamut Shape Analysis Unit]

Figure 22:
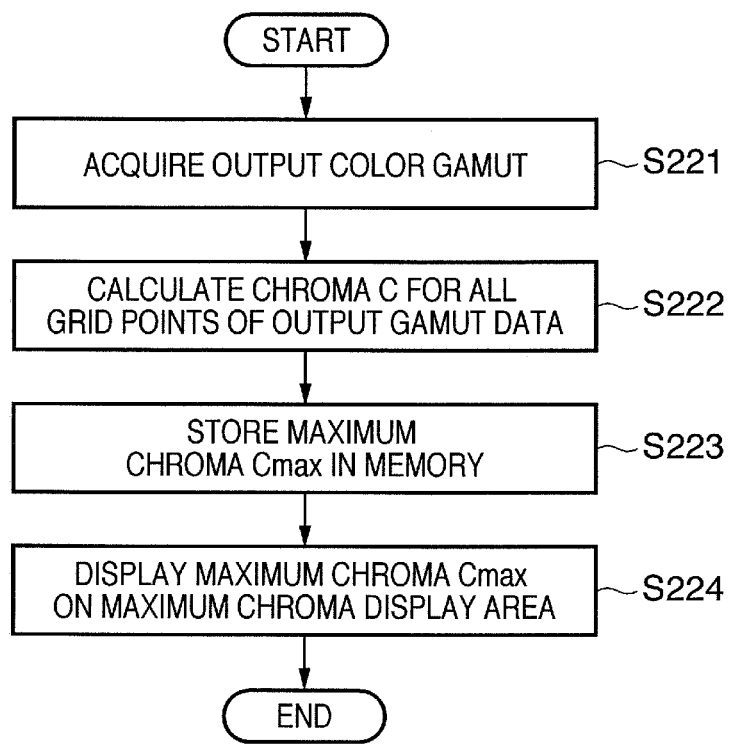
FIG. 22 is a flowchart showing processing of a gamut shape analysis unit.

FIG. 22 is a flowchart showing processing of the gamut shape analysis unit 111.

The gamut shape analysis unit 111 acquires data of the output color gamut from the memory 109 (S221), and calculates chroma C for all the grid points of the output color gamut (S222) using:

$$C=\sqrt{(a^{*2}+b^{*2})} \quad (9)$$

Next, the gamut shape analysis unit 111 stores a chroma value Cmax of the grid point having the maximum chroma C in the memory 109 (S223), and displays the maximum chroma Cmax on the maximum chroma display area 1108 of the UI unit 101 (S224).

Figure 23:
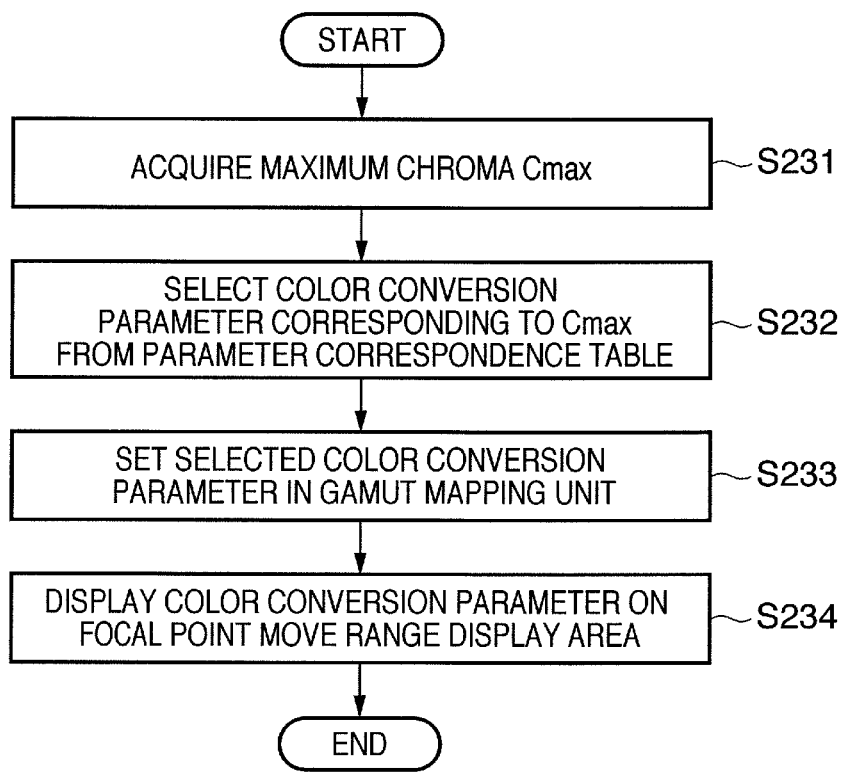
FIG. 23 is a flowchart showing parameter setting processing of the gamut shape analysis unit.

FIG. 23 is a flowchart showing the parameter setting processing of the gamut shape analysis unit 111.

The gamut shape analysis unit 111 acquires the maximum chroma Cmax of the output color gamut (S231), and selects color conversion parameters corresponding to the maximum chroma Cmax with reference to a parameter correspondence table (FIG. 24) which is held in advance (S232).

As shown in FIG. 24, the parameter correspondence table describes color conversion parameters required to implement optimal color conversion for the range of the maximum chroma Cmax. Note that the color conversion parameters include Lmax and Lmin which indicate the moving range of the focal point used upon mapping the input point outside the output color gamut as in the first embodiment. Therefore, the values of Lmax and Lmin are changed depending on the maximum chroma Cmax of the output color gamut.

For example, when the user designates an output color gamut (maximum chroma is small) corresponding to a medium such as plain paper or the like that can hardly exhibit higher chroma, mapping is to be done to exhibit higher chroma as much as possible although the lightness difference before and after mapping becomes large. Otherwise, the chroma difference before and after mapping becomes considerably large, and an undesirable image is output. Hence, Lmin and Lmax required to execute chroma-oriented mapping, i.e., those which have a small difference, are set.

Conversely, when the user designates an output color gamut (maximum chroma is large) corresponding to a medium such as glossy paper or the like that can reproduce high chroma, lightness-oriented mapping is preferably one since the chroma difference before and after mapping does not become so large even when mapping is done to preserve lightness. Hence, Lmin and Lmax required to execute lightness-oriented mapping, i.e., those which have a large difference, are set.

The color space value calculation unit 108 sets the selected color conversion parameters in the gamut mapping unit 107 (S233), and displays the color conversion parameters on the focal point moving range display area 1105 of the UI unit 101 (S234).

As described above, the color conversion parameters are controlled in accordance with the shape of the output color gamut to select chroma-oriented mapping when the maximum chroma of the output color gamut is small, or lightness-oriented mapping when the maximum chroma is large. Therefore, the focal point can be controlled in accordance with the shape of the output color gamut, and calorimetric mapping suited to the output color gamut can be implemented.

Modification of Embodiments

In the above-described exemplary embodiments, the sRGB color space has been described as the color space of the input image. However, the present invention is not limited to such specific color space, and images of any other color spaces such as AdobeRGB, sYCC, and the like may be used.

The case has been exemplified wherein the parameter correspondence table used to set the color conversion parameters is held. For example, a color conversion parameter calculation function which has the color conversion mode and the shape of the output color gamut as variables may be prepared, and the color conversion parameters may be determined using that function.

The case has been exemplified wherein the CIELAB space is used as the color appearance space. However, any other color appearance spaces that model the human visual characteristics may be used. For example, color appearance spaces such as CIECAM97s, CIECAM02, and the like may be used.

The case has been exemplified wherein the user designates an input image, and the input image undergoes color conversion. However, the input data is not limited to an image but it may be mere RGB data. Then, the processing of the above embodiments can be applied to preparation of a color conversion table.

The case has been exemplified wherein the color appearance values are recorded as data indicating the output color gamut. However, the present invention is not limited to the color appearance values, and CIEXYZ values may be used. In this case, the color appearance conversion unit 104 may execute color appearance conversion of the XYZ values of the output color gamut together with the RGB values of the input image.

The case has been exemplified wherein the output color gamut is expressed by the color appearance values on the grid points obtained by slicing the respective RGB value ranges into nine. However, the number of slices is not limited to nine, and may be set as long as the output color gamut can be expressed. For example, the number of slices may be decreased to 5 or 7 to reduce the computation volume or may be increased to 12 or 17 to improve precision. Hence, the number of slices may be set to suit the purposes and use applications intended.

Upon gamut mapping, the focal point on the achromatic axis of the color appearance space is defined by equation (5). However, the focal point is not limited to equation (5), but may be calculated by giving weights according to the lightness, chroma, and hue values.

In the first embodiment, modes for chroma and lightness such as the chroma-oriented mode, balance-oriented mode, lightness-oriented mode, and the like have been explained. However, the present invention is not limited to chroma and lightness, and a mode for, e.g., tonality may be set. In this case, color conversion parameters suited to this mode are prepared, and are stored in the parameter correspondence table.

The second embodiment described the case wherein the gamut shape analysis unit 111 analyzes the maximum chroma Cmax of the output color gamut, and the color conversion parameters are controlled based on the maximum chroma Cmax. However, the gamut shape analysis is not limited to the calculation of the maximum chroma Cmax of the output color gamut. Alternatively, maximum chroma Chmax at hue h may be calculated, and the color conversion parameters may be controlled for respective hue values. Furthermore, lightness Lhmax of the maximum chroma Chmax at hue h may be calculated, and color conversion parameters may be controlled for respective hue values using Chmax and Lhmax.

Exemplary Embodiments

The present invention can be applied to a system constituted by a plurality of devices (e.g., host computer, interface, reader, printer) or to an apparatus comprising a single device (e.g., copying machine, facsimile machine).

Further, the present invention can provide a storage medium storing program code for performing the above-described processes to a computer system or apparatus (e.g., a personal computer), reading the program code, by a CPU or MPU of the computer system or apparatus, from the storage medium, then executing the program.

In this case, the program code read from the storage medium realizes the functions according to the embodiments.

Further, the storage medium, such as a floppy disk, a hard disk, an optical disk, a magneto-optical disk, CD-ROM, CD-R, a magnetic tape, a non-volatile type memory card, and ROM can be used for providing the program code.

Furthermore, besides above-described functions according to the above embodiments can be realized by executing the program code that is read by a computer, an OS (operating system) or the like working on the computer can perform a part or entire processes in accordance with designations of the program code and realizes functions according to the above embodiments.

Furthermore, after the program code is read from the storage medium, it can be written in a function expansion card which is inserted into the computer or in a memory provided in a function expansion unit which is connected to the computer, CPU or the like, and the function expansion card or unit can perform a part or entire process in accordance with designations of the program code.

In a case where the present invention is applied to the aforesaid storage medium, the storage medium stores program code corresponding to the flowcharts described in the embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent No. 2006-100385, filed Mar. 31, 2006, which is hereby incorporated by reference herein in its entirety.

What is claimed is:

1. A color processing apparatus comprising:
   a holding section configured to hold a plurality of color conversion parameters in a table, wherein the plurality of color conversion parameters correspond to a plurality of gamut mapping modes, the types of the plurality of gamut mapping modes are different from each other, and the plurality of gamut mapping modes include at least a lightness-oriented mode and a chroma-oriented mode;
   a displaying section configured to display a user interface for selecting one of the types of the plurality of gamut mapping modes;
   a determining section configured to determine a gamut mapping mode among the plurality of gamut mapping modes in accordance with a user instruction input from the user interface;
   a selector configured to select a color conversion parameter, which corresponds to the determined gamut mapping mode, from the table;
   an obtaining section configured to obtain a color gamut of an output device;
   a setting section arranged to set a moving range of a focal point in accordance with the selected color conversion parameter; and
   a mapping section configured to perform gamut mapping based on the color gamut of the output device and the moving range of the focal point,
   wherein the moving range of the focal point in the lightness-oriented mode is larger than that in the chroma-oriented mode, and
   wherein the mapping section sets the focal point corresponding to input color in the moving range and maps the input color into the color gamut of the output device using the set focal point.

2. The color processing apparatus according to claim 1, wherein the focal point is moved on an achromatic axis.

3. The color processing apparatus according to claim 1, wherein the mapping section sets the focal point for the input color in the moving range in accordance with lightness of the input color.

4. The color processing apparatus according to claim 1, wherein the mapping section maps the input color on an intersection between a boundary surface of the color gamut of the output device and a line which connects the input color and the focal point.

5. The color processing apparatus according to claim 1, further comprising:
   an input section configured to input information indicating a destination to output an image; and
   an output section configured to output an image on which the gamut mapping is performed to the destination.

6. A color processing method comprising:
   holding a plurality of color conversion parameters in a table, wherein the plurality of color conversion parameters correspond to a plurality of gamut mapping modes, the types of the plurality of gamut mapping modes are different from each other, and the plurality of gamut mapping modes include at least a lightness-oriented mode and a chroma-oriented mode;
   displaying a user interface for selecting one of the types of the plurality of gamut mapping modes;
   determining a gamut mapping mode among the plurality of gamut mapping modes in accordance with a user instruction input from the user interface;
   selecting a color conversion parameter, which corresponds to the determined gamut mapping mode, from the table;
   obtaining a color gamut of an output device;
   setting a moving range of a focal point in accordance with the selected color conversion parameter; and
   performing gamut mapping based on the color gamut of the output device and the moving range of the focal point,
   wherein the moving range of the focal point in the lightness-oriented mode is larger than that in the chroma-oriented mode, and
   wherein, in the gamut mapping, the focal point corresponding to input color is set in the moving range and the input color is mapped into the color gamut of the output device using the set focal point.

7. A non-transitory computer-readable medium storing a computer-executable program for causing a computer to perform a color processing method, the method comprising:
   holding a plurality of color conversion parameters in a table, wherein the plurality of color conversion parameters correspond to a plurality of gamut mapping modes, the types of the plurality of gamut mapping modes are different from each other, and the plurality of gamut mapping modes include at least a lightness-oriented mode and a chroma-oriented mode;
   displaying a user interface for selecting one of the types of the plurality of gamut mapping modes;
   determining a gamut mapping mode among the plurality of gamut mapping modes in accordance with a user instruction input from the user interface;
   selecting a color conversion parameter, which corresponds to the determined gamut mapping mode, from the table;
   obtaining a color gamut of an output device;
   setting a moving range of a focal point in accordance with the selected color conversion parameter; and
   performing gamut mapping based on the color gamut of the output device and the moving range of the focal point,
   wherein the moving range of the focal point in the lightness-oriented mode is larger than that in the chroma-oriented mode, and
   wherein, in the gamut mapping, the focal point corresponding to input color is set in the moving range and the input color is mapped into the color gamut of the output device using the set focal point.

* * * * *